US006842923B1

(12) United States Patent
Castellani et al.

(10) Patent No.: US 6,842,923 B1
(45) Date of Patent: Jan. 18, 2005

(54) LIGHTWEIGHT DECONTAMINABLE COMPOSITE STRETCHER

(76) Inventors: Robert Castellani, 126 Hombuckle Dr., Easley, SC (US) 29642; Leon Ling, 124 Pioneer Road, Singapore (SG), 639584

( * ) Notice: Subject to any disclaimer, the term of this patent is extended or adjusted under 35 U.S.C. 154(b) by 4 days.

(21) Appl. No.: 10/634,107

(22) Filed: Aug. 4, 2003

(51) Int. Cl.[7] .......................... A61G 1/013; F16C 11/10

(52) U.S. Cl. ................................ 5/627; 5/625; 16/228; 16/234; 16/374

(58) Field of Search ..................... 5/625–629; 128/870; 16/228, 374, 234

(56) References Cited

U.S. PATENT DOCUMENTS

| | | | | |
|---|---|---|---|---|
| 1,165,747 A | * 12/1915 | Brockway | 403/353 |
| 1,764,477 A | * 6/1930 | Weber-Stierlin | 5/627 |
| 2,327,919 A | * 8/1943 | Montgomery | 5/627 |
| 2,394,245 A | * 2/1946 | Koller | 5/627 |
| 3,417,412 A | 12/1968 | Andrews | 5/82 |
| 3,653,079 A | 4/1972 | Bourgraf et al. | 5/82 |
| 3,801,208 A | * 4/1974 | Bourgraf et al. | 403/95 |
| 3,886,606 A | 6/1975 | Bradford | 5/82 |
| 3,890,659 A | * 6/1975 | Staubs | 5/625 |
| 4,186,460 A | * 2/1980 | Artman | 16/274 |
| 4,226,231 A | * 10/1980 | Andersen | 128/870 |
| 4,670,921 A | 6/1987 | Avni et al. | 5/82 |
| 4,699,479 A | * 10/1987 | Metcalfe | 351/153 |
| 4,742,587 A | 5/1988 | Dove | 5/82 |
| D301,021 S | 5/1989 | Dommerud | D12/128 |
| 5,109,555 A | * 5/1992 | Fickler | 5/627 |
| 5,263,213 A | 11/1993 | Robertson et al. | 5/627 |
| 5,473,784 A | * 12/1995 | Nixon et al. | 5/625 |
| 5,502,854 A | 4/1996 | Daouk | 5/627 |
| 5,572,756 A | 11/1996 | Muuranen et al. | 5/626 |
| 5,598,592 A | 2/1997 | Castellani | 5/627 |
| 6,061,853 A | 5/2000 | Laaksonen et al. | 5/625 |
| 6,526,611 B2 | 3/2003 | Flynn et al. | 5/611 |
| 6,564,428 B2 | * 5/2003 | Richard et al. | 16/366 |

FOREIGN PATENT DOCUMENTS

| | | | |
|---|---|---|---|
| CH | 24709 | 10/1901 | |
| CH | 379689 | 8/1964 | |
| GB | 488504 | 7/1938 | |
| GB | 2 041 764 A | 9/1980 | A61G/1/00 |
| SE | 188 494 | 3/1964 | |

OTHER PUBLICATIONS

Pub.No. FR002722401A1 Folding stretcher, suitable for dropping by parachute, Pub. Date: Jan. 19, 1996, 2,722,401, 94 08762.

* cited by examiner

*Primary Examiner*—Robert G. Santos
(74) *Attorney, Agent, or Firm*—McNair Law Firm, P.A.

(57) ABSTRACT

A stretcher comprising a molded frame assembly having a first frame pole and a second frame pole interconnected by a spreader bar for maintaining poles in a laterally spaced arrangement. A bed member is carried by the frame poles adapted for receiving and supporting a person. The molded frame assembly is constructed of a composite of 50% to 85% polyamide resin and 15% to 50% fiberglass by weight to resist hazardous materials and allow for decontamination of the frame assembly. The frame poles are constructed from a plurality of frame arms. A hinge pivotally connects abutting ends of frame arms, and a hinge support carried opposite the hinge further interconnects frame arms to increase the structural rigidity of the hinge. The frame poles having a hollow interior cavity to reduce weight with reinforcing members disposed in the cavity running the length of the cavity to resist bending and twisting.

19 Claims, 8 Drawing Sheets

LIGHTWEIGHT DECONTAMINABLE COMPOSITE STRETCHER

FIELD OF THE INVENTION

The present invention relates to litters, stretchers, cots, and the like, and more particularly, to a reinforced lightweight composite stretcher specifically capable of being decontaminated from chemical and biological warfare agents, as well as other hazardous materials.

BACKGROUND OF THE INVENTION

The prior art is replete with various types of stretchers. However, none of these stretchers were designed to be resistant to the types of chemical and biological warfare agents available today sufficient to be decontaminated when exposed to such severely hazardous material.

For example, U.S. Pat. No. 5,598,592, discloses a stretcher for allowing decontamination of a person while on the stretcher without having to remove the person from the stretcher. The frame is made from metal or wood tubular poles painted with a chemical resistant paint, and the hand grips, which are inserted into the poles are constructed using nylon 6/6. While this construction will resist moderately hazardous material, more dangerous hazardous materials such as VX nerve gas, and other chemical and biological warfare agents, easily penetrate the painted metal or wood poles, rendering the stretcher useless after carrying its first contaminated person. Additionally, there is no teaching of the handles being constructed in a manner sufficient to be decontaminated on site from potent chemical and biological warfare agents.

British Patent No. 488,504 discloses a litter in which the frame members are constructed of metal tubing closed at the ends so as to be impervious to gas to a higher degree than other litters of the time (1938). Again, today's chemical and biological warfare agents easily penetrate into the metal, highly contaminating the litter and making field decontamination impossible for continued use of the litter. This invention was simply not directed to solving the problem of direct penetration of the litter frame by hazardous materials.

U.S. Pat. Nos. 5,263,213; 3,417,412; 6,526,611; and 5,572,756 disclose stretchers which may be constructed using a variety of materials such as fiberglass or plastic. However, there is no disclosure of any of the stretchers being constructed from a lightweight composite material resistant to chemical and biological warfare agents so as to be decontaminable, while also being strong enough to support the weight of a person.

Accordingly, it is an object of the present invention to provide a stretcher capable of resisting severely hazardous materials such as chemical and biological warfare agents sufficient to allow for on site decontamination of the stretcher while carrying a person so that the stretcher may continue to be used without further contamination to the users.

It is an object of the present invention to provide a foldable stretcher to facilitate transport and storage of the stretcher when not in use.

It is an object of the present invention to provide a lightweight composite frame for a stretcher which is reinforced to resist bending and twisting when carrying a person.

SUMMARY OF THE INVENTION

The above objectives are accomplished according to the present invention by providing a lightweight decontaminable stretcher for transporting injured persons and persons exposed to hazardous materials comprised of the elements set forth below. The stretcher includes a molded frame assembly having a first frame pole and a second frame pole interconnected by a spreader bar for maintaining the first and second frame poles in a laterally spaced arrangement. A bed member is carried by the first and second frame poles which is adapted for receiving and supporting a person between the frame poles. In the preferred embodiment, the molded frame assembly is constructed of a composite of 50% to 85% by weight of a polyamide resin containing 15% to 50% fiberglass by weight to resist hazardous materials and allow for decontamination of the frame assembly. Preferably, the polyamide resin used in constructing the frame assembly is polyhexamethylene adipamide (nylon 6/6), which provides excellent resistance to chemical and biological warfare agents.

The first frame pole and the second frame pole are constructed from a plurality of frame arms pivotally connected for moving between a folded configuration wherein the frame arms for each pole are generally stacked upon each other, and an unfolded configuration wherein the frame arms are aligned end to end in a common plane to form each of the frame poles.

A hinge pivotally connects abutting ends of the frame arms, and a hinge support carried opposite the hinge further interconnects abutting ends of the frame arms when in the unfolded configuration to increase structural rigidity of the hinge. The hinge support disengages abutting ends of the frame arms to allow the frame arms to move to the folded configuration.

The hinge includes a first hinge portion carried by a distal end of a first frame arm, and a second hinge portion carried by an abutting distal end of a second frame arm. The first and second hinge portions have a plurality of spaced hinge projections forming a series of hinge slots. The hinge projections engage the hinge slots of the abutting frame arm so that the hinge projections of the first and second frame arms overlap. A pivot pin is used to pivotally connect overlapping hinge projections from the first and second hinge portion.

The hinge support includes a first support portion carried by the distal end of the first frame arm opposite the first hinge portion, and a second support portion carried by the abutting distal end of the second frame arm opposite the second hinge portion. The first and second support portions have a plurality of spaced support projections forming a series of support slots. The support projections engage the support slots of the abutting frame arm when in the unfolded configuration so that the support projections interconnect abutting ends of frame arms to resist twisting of the frame arms.

Advantageously, each of the frame arms includes an interior cavity running the length of the frame arm with at least one rib member molded into the frame arm protruding from an interior surface of the frame arm into the interior cavity and generally running the length of the interior cavity to restrict bending and twisting of the frame arm. Alternatively, or in addition to, at least one cross member is molded into the frame arm extending through the interior cavity from the interior surface of the frame arm and generally running the length of the interior cavity to restrict bending and twisting of the frame arm.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
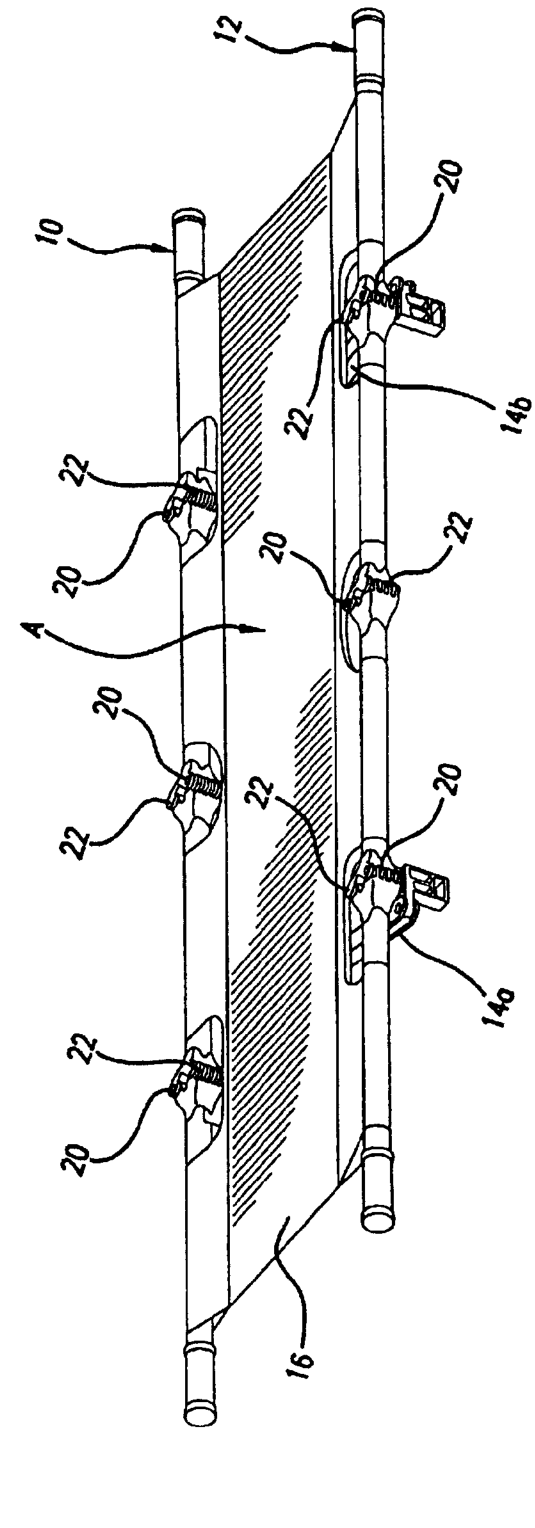
FIG. 1 shows a perspective view of the stretcher according to the invention.

With reference to the drawings, the invention will now be described in more detail. In this patent the term "hazardous materials" specifically includes chemical and biological warfare agents, along with hazardous, dangerous and otherwise unsafe chemicals requiring a person to be decontaminated after expose, radioactive or poisonous elements, and human bodily fluids. Referring to FIG. 1, a lightweight decontaminable stretcher, designated generally as A, is shown for transporting injured persons and persons exposed to hazardous materials. In the preferred embodiment, stretcher A includes a molded frame assembly having a first frame pole, designated generally as 10, and a second frame pole, designated generally as 12. Frame poles 10 and 12 are interconnected by spreader bars 14*a* and 14*b* (best shown in FIG. 5*a*) for maintaining first frame pole 10 and second frame poles 12 in a laterally spaced arrangement. As described in detail below, spreader bars 14*a* and 14*b* may be retracted to draw the frame poles closer together to configure the stretcher between an unfolded configuration (FIG. 5*a*) and a folded configuration (FIG. 5*f*), providing for easy storage and transportation when folded.

A bed member 16 is carried by the first and second frame poles which is adapted for receiving and supporting a person between frame poles 10 and 12. In a preferred embodiment, bed 16 is constructed of a large mesh of monofilament polypropylene, polyester, polyamide, or a blend thereof, which is resistant to hazardous materials and may easily and safely decontaminated. The large mesh bed prevents the patient from slipping on or from the bed while being carried or while being decontaminated. Additionally, the large mesh allows for the decontamination of the patient while on the stretcher without the risk of creating hot spots of hazardous materials where the patient is in contract with the bed. Such hot spots are a risk when solid surface materials, such as backboards, are used to support the patient during decontamination. The present invention eliminated this problem.

Advantageously, the molded frame assembly, defined as frame poles 10 and 12 together with spreader bars 14*a* and 14*b*, is constructed of a composite of 50% to 85% by weight of a polyamide resin containing 15% to 50% fiberglass by weight to resist hazardous materials. The composite provides the necessary resistance to chemical and biological warfare agents, such as VX nerve gas, to allow for decontamination of the frame assembly sufficient to allow continued use of the stretcher without the risk of further contamination to the person being carried on the stretcher, or to persons carrying the stretcher. The polyamide resin is selected from the group consisting of polycaprolactam (nylon 6), polytetramethylene adipamide (nylon 4/6), polyhexamethylene adipamide (nylon 6/6), polyhexamethylene sebacamide (nylon 6/10), polyhexamethylene dodecamide (nylon 6/12), polyundecamethylene adipamide (nylon 11/6), polyundecalactam (nylon 11), polydodecalactam (nylon 12), polytrimethylhexamethylene terephthalamide (nylon TMHT), polyhexamethylene isophthalamide (nylon 6I), polynonanemethylene terephthalamide (9T), polyhexamethylene terephthalamide (6T), polybis (4-aminocyclohexyl) methane dodecamide (nylon PACM12), polybis(3-methyl-aminocyclohexyl)methane dodecamide (nylondimethyl PACM12), polymethaxylylene adipamide (nylon MXD6) and polyundecamethylene hexahydroterephthalamide (nylon 11T(H)) and polyamide copolymers, and mixtures thereof. Preferably, the polyamide resin used in constructing the frame assembly is polyhexamethylene adipamide (nylon 6/6), mixed at a ration of 65% nylon and 35% fiberglass by weight, which provides excellent resistance to known chemical and biological warfare agents. As an added benefit, the molded composite frame assembly is extremely durable and considerably lighter than other stretcher of comparable design which are typically made of metal. Preferably, the composite frame poles are formed through and injection molding process, as is commonly known to a person skilled in the art.

Figure 5A:
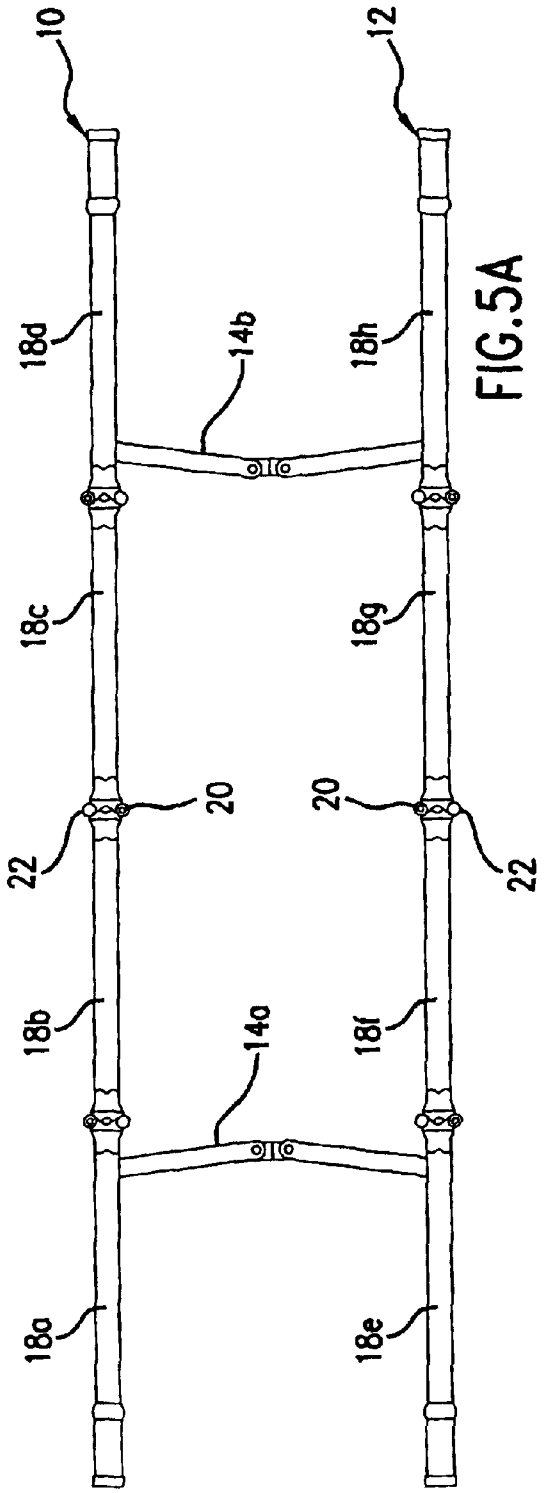
FIG. 5*a* shows a top view of the stretcher in the unfolded configuration.
Figure 5B:
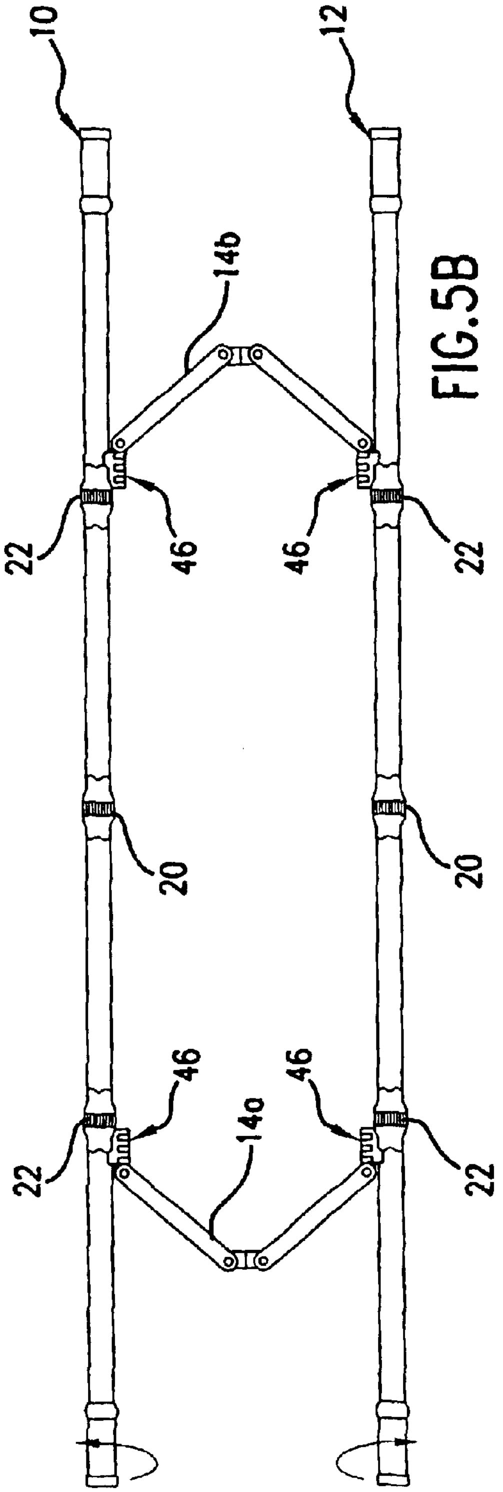
FIG. 5*b* shows rotation of the frame poles prior to folding the stretcher.
Figure 5C:
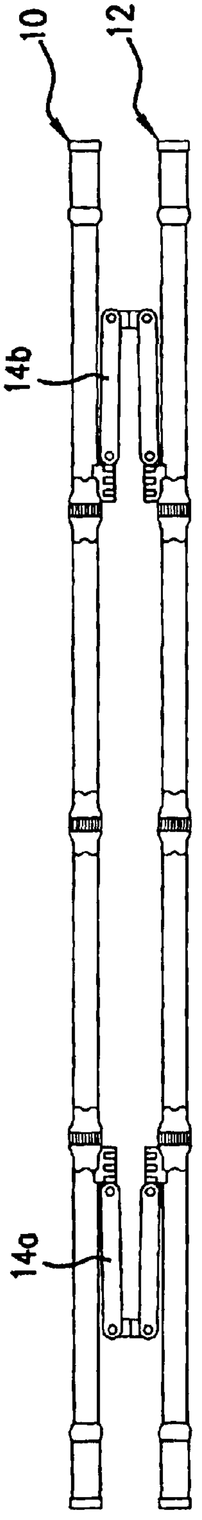
FIG. 5*c* shows a top view of the stretcher with the spreader bars retracted.
Figure 5D:
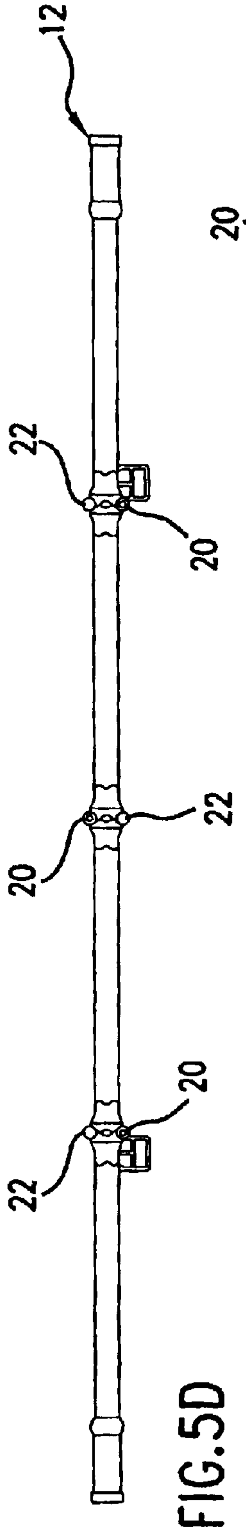
FIG. 5*d* shows a side view of the stretcher in the unfolded configuration.
Figure 5E:
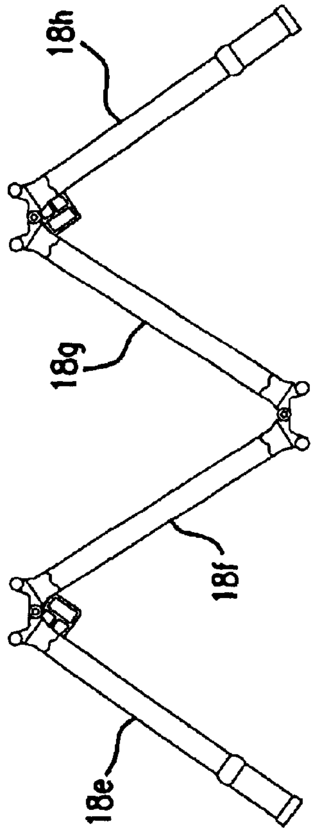
FIG. 5*e* shows a side view of the stretcher being folded.
Figure 5F:
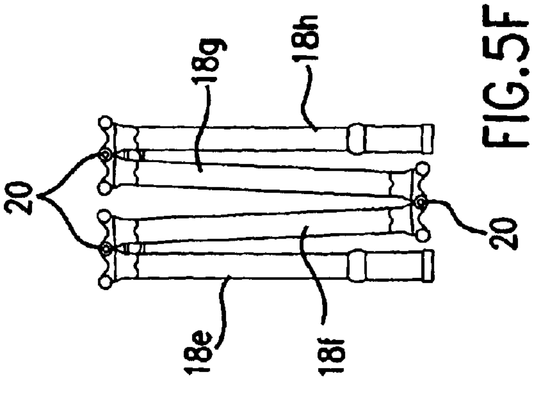
FIG. 5*f* shows a side view of the stretcher in the folded configuration.

Referring to FIG. 5*a*, first frame pole 10 is constructed from a plurality of frame arms 18*a*–d that are pivotally connected. Second frame pole 12 is similarly constructed from a plurality of frame arms 18*e*–*h*, which are also pivotally connected. The pivotally connected frame arms allow the stretcher to move between the unfolded configuration shown in FIG. 5*a*, wherein the frame arms are aligned end to end in a common plane to form each of frame poles 10 and 12, and the folded configuration as shown in FIG. 5*f*, wherein the frame arms for each of poles 10 and 12 are aligned side to side and generally stacked upon each other to allow for easy storage and transportation.

Referring to FIG. 1, a hinge 20 provides the pivotal connection between abutting ends of frame arms 18*a*–*h*. Advantageously, a hinge support 22 is carried by the frame arms opposite hinge 20 for further interconnecting abutting ends of the frame arms when in the unfolded configuration to increase the structural rigidity of hinge 20 to prevent bending and twisting of the hinge when carrying the weight of a person. As best shown in FIG. 3*d*, hinge support 22 also disengages and separates to allow abutting ends of the frame arms opposite hinge 20 to pivot so that the frame assembly can be moved to the folded configuration, as described in more detail below. Hinge support 22 is necessary to reinforce each hinge so that the lightweight composite material will not break at hinge 20 under heavy loads. Effectively, hinge support 22 doubles the strength of hinge 20 by equally distributing forces between hinge 20 and hinge support 22 through the specific structure of hinge 20 and hinge support 22 described herein.

Figure 2:
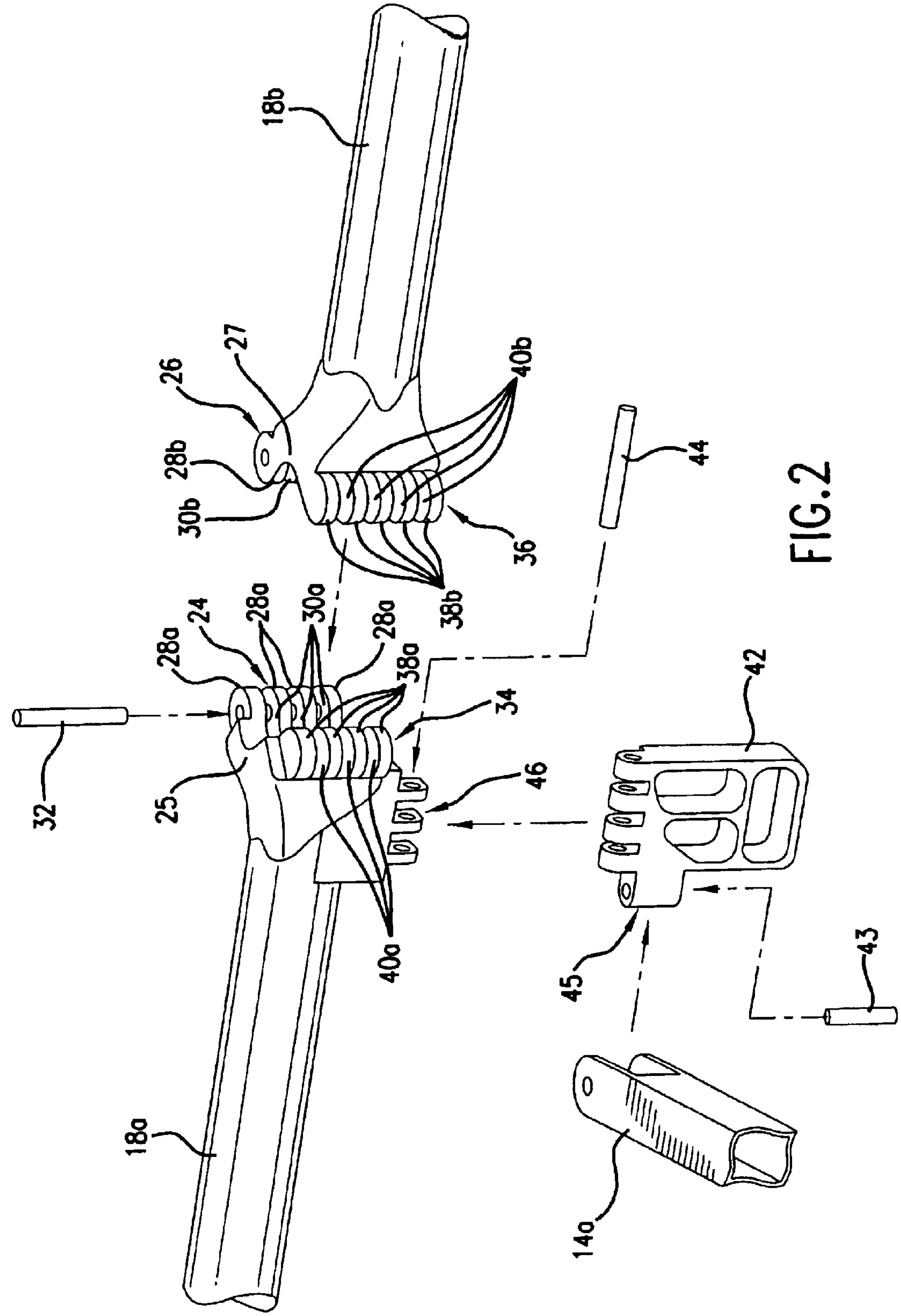
FIG. 2 shows an exploded view of a hinge according to the invention.
Figure 3A:
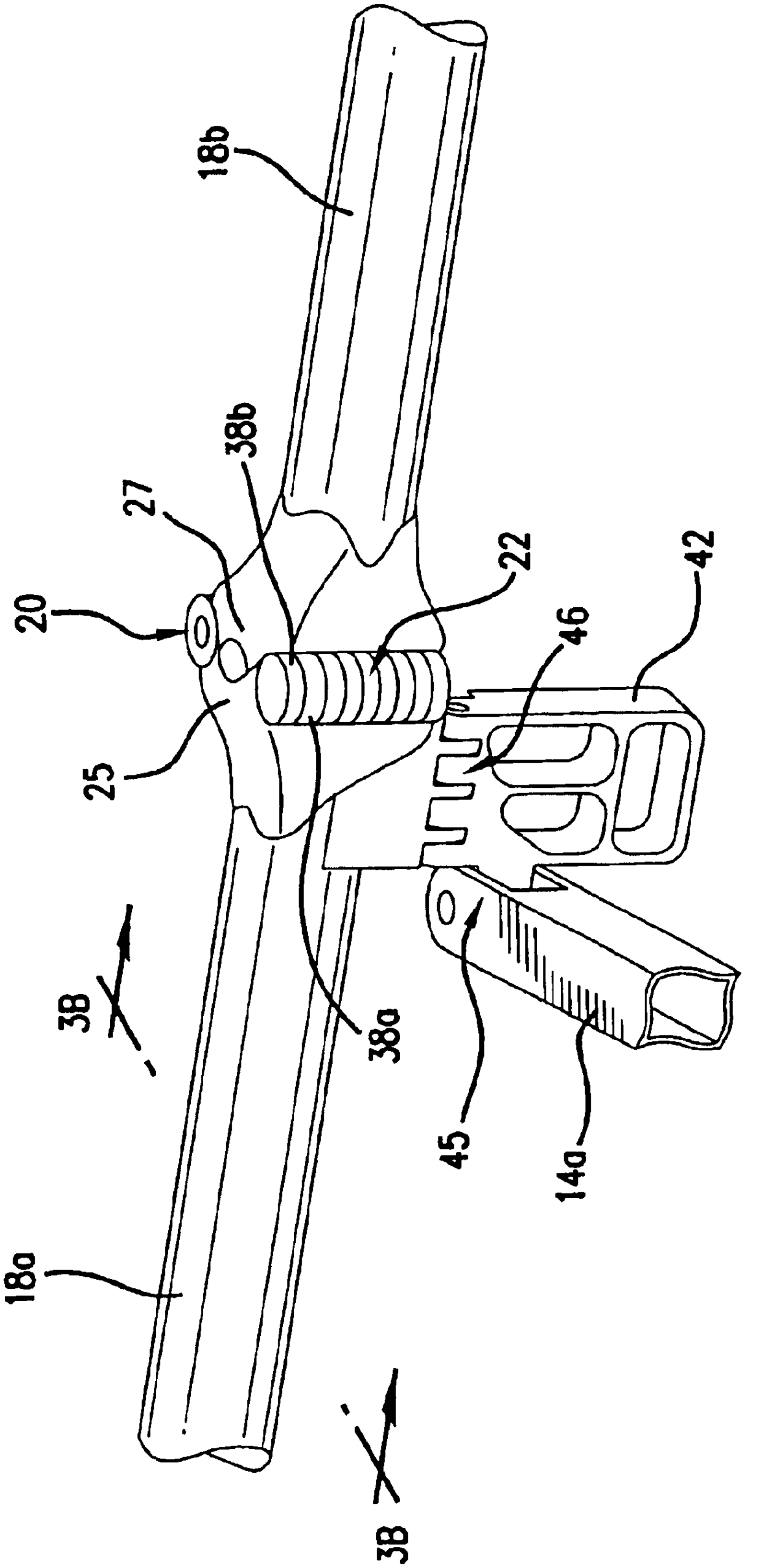
FIG. 3*a* shows a completed hinge according to the invention.
Figure 3B:
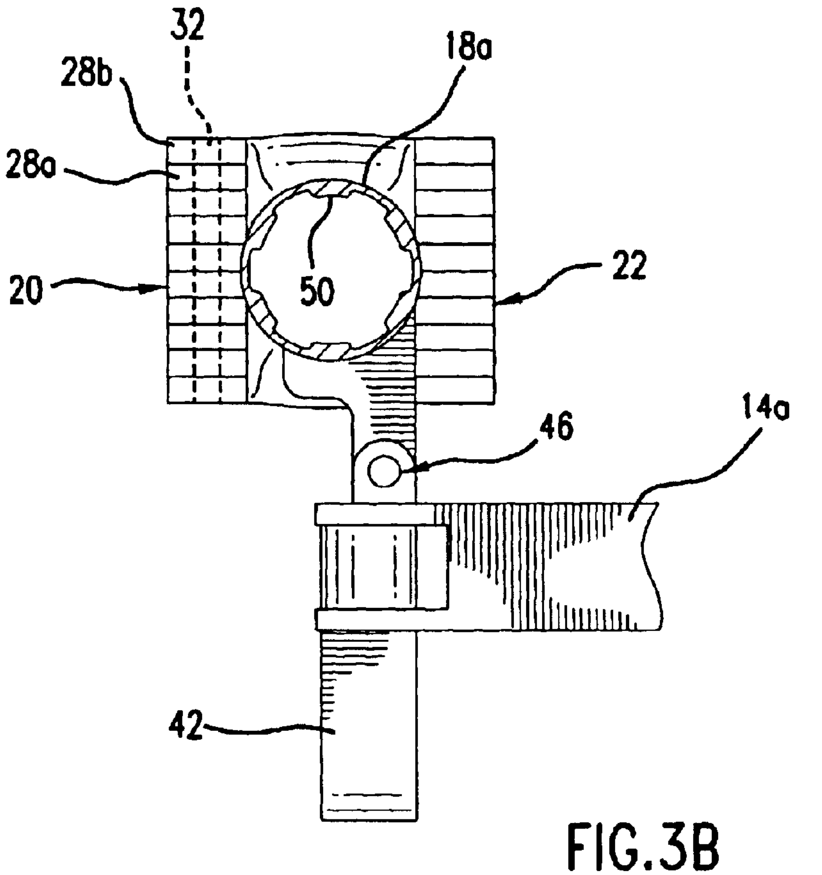
FIG. 3*b* shows an end view of a frame pole in an unfolded configuration allowing use of the stretcher.

Referring to FIGS. 2 and 3*a*, hinge 20 includes a first hinge portion, designated generally as 24, carried by a distal end 25 of a first frame arm 18*a*. It is to be understood that the construction described here applies to all hinges between abutting ends of any of frame arms 18*a–h*. A second hinge portion, designated generally as 26, is carried by an abutting distal end 27 of a second frame arm 18*b*. First hinge portion 24 has a plurality of spaced hinge projections 28*a* forming a series of hinge slots 30*a*. Second hinge portion 26 has a plurality of complementary spaced hinge projections 28*b* forming a series of complementary hinge slots 30*b*. Hinge projections 28*a* engage hinge slots 30*b* at distal ends 25 and 27 of abutting frame arms 18*a* and 18*b*, respectively, as shown in FIG. 3*b*, so that hinge projections 28*a* of frame arm 18*a* overlap hinge projections 28*b* of frame arm 18*b*, as best shown in FIGS. 1 and 3*b*. Referring to FIGS. 2 and 3*b*, a pivot pin 32 is used to pivotally connect overlapping hinge projections 28*a* and 28*b* from first hinge portion 24 and second hinge portion 26 to provide the completed hinge 20.

Referring to FIGS. 2 and 3*a*, hinge support 22 includes a first support portion, designated generally as 34, carried by distal end 25 of first frame arm 18*a*, opposite first hinge portion 24. Again, it is to be understood that the following arrangement applies to all hinge supports between abutting ends of any of frame arms 18*a–h*. A second support portion, designated generally as 36, is carried by abutting distal end 27 of second frame arm 18*b*, opposite second hinge portion 26. First support portion 34 has a plurality of spaced support projections 38*a* forming a series of support slots 40*a*. Second support portion 36 has a plurality of complementary spaced support projections 38*b* forming a series of complementary support slots 40*b*. Support projections 38*a* engage support slots 40*b* at distal ends 25 and 27 of abutting frame arms 18*a* and 18*b*, respectively, as shown in FIG. 3*a*, so that support projections 38*a* of frame arm 18*a* overlap support projections 38*b* of frame arm 18*b* to interconnect abutting ends 25 and 27 of frame arms 18*a* and 18*b* to resist twisting of the frame arms when the stretcher is in the unfolded configuration, represented in FIGS. 1 and 5*a*.

In the preferred embodiment, spreader bar 14*a*, as well as spreader bar 14*b*, interconnect frame poles 10 and 12 by way of accessory bracket 42. As shown in FIGS. 2 and 3*a*, spreader bar 14*a* is hingedly connected to accessory bracket 42 by pivot pin 43 at a pivot point, designated generally as 45. Accessory bracket 42 is used for attaching items such as wheels, stands, legs, and other items that may be used in combination with the stretcher. Accessory bracket 42 is then further hingedly connected to frame arm 18*a* using pivot pin 44 at a second pivot point, designated generally as 46. This connection is repeated at each end of spreader bars 14*a* and 14*b* to interconnect the spreader bars with the various frame arms comprising the frame poles.

Figure 3C:
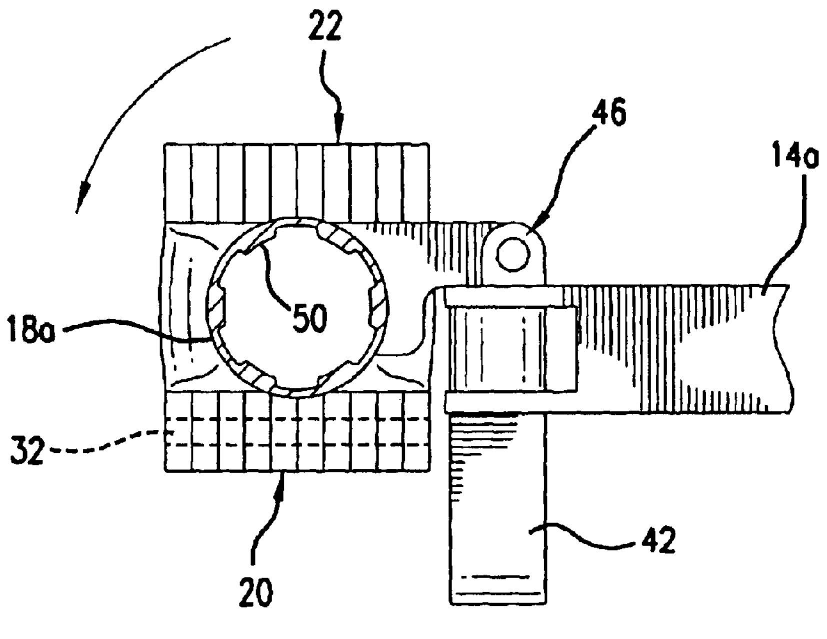
FIG. 3*c* shows an end view of a frame pole rotated to allow folding of the stretcher.
Figure 3D:
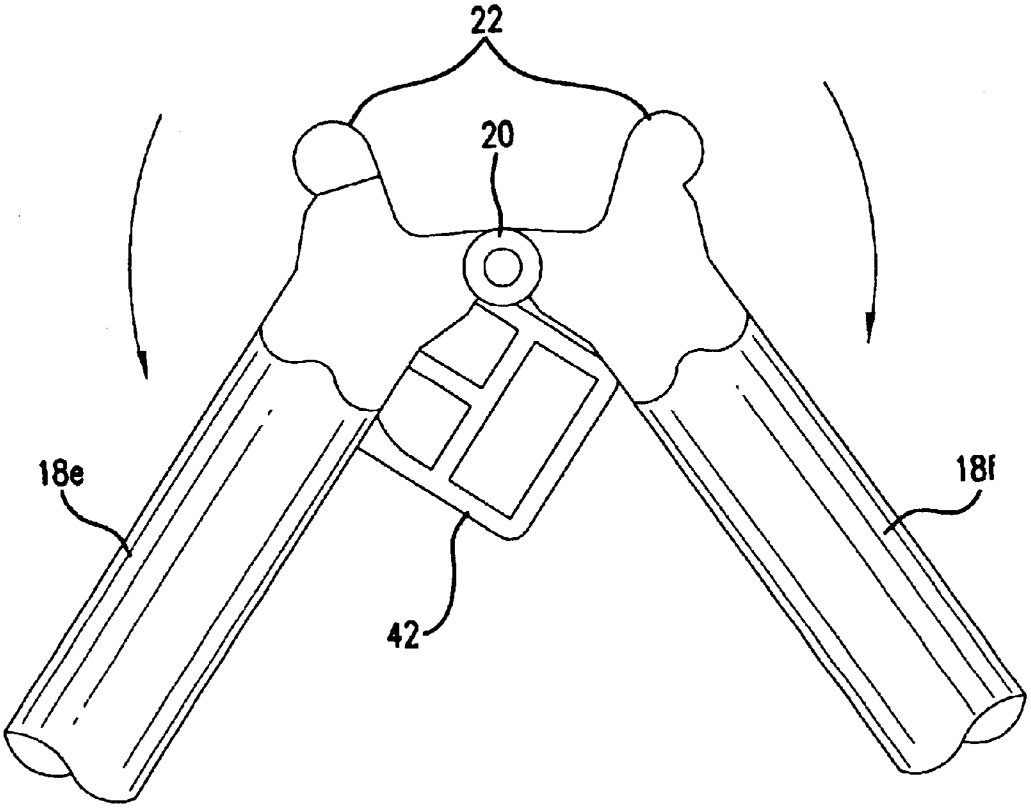
FIG. 3*d* shows a hinge pivoted open to allow the stretcher to be place in the folded configuration.

The pivoting connection between the spreader bars, accessory brackets, and frame arms is necessary to allow for folding of the frame assembly, while also allowing the frame arms to be locking in the unfolded configuration to prevent collapse of the frame poles when carrying a person. Referring to FIG. 3*b*, when the frame assembly is in the unfolded configuration of FIG. 5*a*, hinge 20 and hinge support 22 are oriented in a vertical alignment and will not pivot when the stretcher is picked up. Spreader bars 14*a* and 14*b* further prevent the hinges from pivoting laterally. Accordingly, in order to fold the frame arms into the folded configuration of FIG. 5*f*, frame poles 10 and 12 must be pivoted to align hinges 20 in a lateral arrangement which will allow the frame arms to be folded together. As best shown in FIGS. 3*c* and 5*b*, the frame poles are first pivoted on pivot points 46 so that hinges 20 are rotated 90° from the vertical alignment in the unfolded configuration shown in FIG. 3*b*. Next, as shown in FIG. 5*c*, spreader bars 14*a* and 14*b* are retracted into a collapsed position to draw frame poles 10 and 12 together so that they are only separated by the width of the collapsed spreader bars. Referring to FIGS. 5*d*–5*f*, with hinges 20 in a lateral alignment, the frame arms can be pivoted to draw them together to the folded configuration, disengaging hinge supports 22 at the same time to allow movement of the frame arms through the various illustrated folding stages.

Figure 4A:
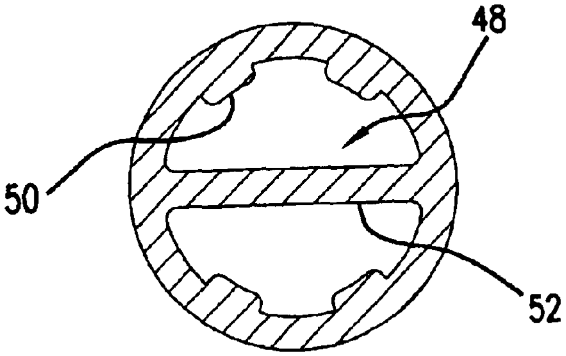
FIG. 4*a* shows a cross-section view of a frame member having reinforcing rib and cross members.
Figure 4B:
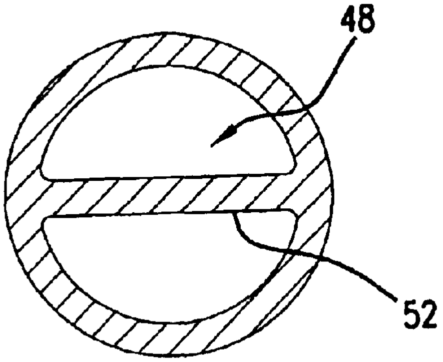
FIG. 4*b* shows a cross-section view of a frame member having a reinforcing cross member.
Figure 4C:
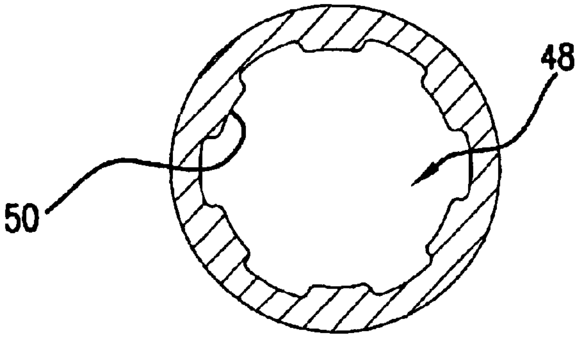
FIG. 4*c* shows a cross-section view of a frame member having a plurality of reinforcing rib members.

Referring to FIGS. 4*a*–4*c*, advantageously, each of the frame arms is constructed to include an interior cavity, designated generally as 48, which is intended to remove as much material as possible to make the frame arms light, while still maintaining the durability and strength of the frame arms. Preferably, the interior cavity runs the length of the frame arm. In order to remove as much material as possible while maintaining the structural integrity of the frame arms, at least one rib member 50 is molded into the frame arm protruding from an interior surface of the frame arm into interior cavity 48. As shown in FIGS. 4*a* and 4*c*, a plurality of rib members 50 are spaced around the interior circumference of cavity 48 to provide the best strength to weight ratio. The rib member preferably runs the length of the interior cavity to restrict bending and twisting of the frame arm. Referring to FIGS. 4*a* and 4*b*, in addition to rib member 50, or independently, at least one cross member 52 is molded into the frame arm extending through interior cavity 48 from the interior surface of the frame arm. Again, cross member 52 preferably runs the length of the interior cavity to restrict bending and twisting of the frame arm.

While a preferred embodiment of the invention has been described using specific terms, such description is for illustrative purposes only, and it is to be understood that changes and variations may be made without departing from the spirit or scope of the following claims.

What is claimed is:

1. A lightweight decontaminable stretcher for transporting injured persons and persons exposed to hazardous materials, comprising:

a molded frame assembly having a first frame pole and a second frame pole interconnected by a spreader bar for maintaining said first and second frame poles in a laterally spaced arrangement;

a bed member carried by said first and second frame poles adapted for receiving and supporting a person between said frame poles; and, said molded frame assembly constructed of a composite of 50% to 85% by weight of a polyamide resin containing 15% to 50% fiberglass by weight to resist hazardous materials and allow for decontamination of said frame assembly.

2. The stretcher of claim 1 wherein said polyamide resin is selected from the group consisting of polycaprolactam (nylon 6), polytetramethylene adipamide (nylon 4/6), polyhexamethylene adipamide (nylon 6/6), polyhexamethylene sebacamide (nylon 6/10), polyhexamethylene dodecamide (nylon 6/12), polyundecamethylene adipamide (nylon 11/6), polyundecalactam (nylon 11), polydodecalactam (nylon 12), polytrimethylhexamethylene terephthalamide (nylon TMHT), polyhexamethylene isophthalamide (nylon 6I), polynonanemethylene terephthalamide (9T), polyhexamethylene terephthalamide (6T), polybis (4-aminocyclohexyl) methane dodecamide (nylon PACM12), polybis(3-methylaminocyclohexyl)methane dodecamide (nylondimethyl PACM12), polymethaxylylene adipamide (nylon MXD6) and polyundecamethylene hexahydroterephthalamide (nylon 11T(H)) and polyamide copolymers, and mixtures thereof.

3. The stretcher of claim 1 wherein said first frame pole and said second frame pole are constructed from a plurality of frame arms pivotally connected for moving between a folded configuration wherein said frame arms for each pole are generally stacked upon each other, and an unfolded configuration wherein said frame arms are aligned end to end in a common plane to form each of said frame poles.

4. The stretcher of claim 3 including a hinge pivotally connecting abutting ends of said frame arms, and a hinge support carried opposite said hinge interconnecting abutting ends of said frame arms when in said unfolded configuration, and said hinge support disengaging abutting ends of said frame arms to allow said frame arms to move to said folded configuration.

5. The stretcher of claim 4 wherein said hinge includes a first hinge portion carried by a distal end of a first frame arm, and a second hinge portion carried by an abutting distal end of a second frame arm; said first and second hinge portions have a plurality of spaced hinge projections forming a series of hinge slots; said hinge projections engaging said hinge slots of the abutting frame arm so that said hinge projections of said first and second frame arms overlap; and a pivot pin pivotally connecting overlapping hinge projections from said first and second hinge portion.

6. The stretcher of claim 5 wherein said hinge support includes a first support portion carried by said distal end of said first frame arm opposite said first hinge portion, and a second support portion carried by said abutting distal end of said second frame arm opposite said second hinge portion; said first and second support portions have a plurality of spaced support projections forming a series of support slots; said support projections engaging said support slots of the abutting frame arm when in said unfolded configuration so that said support projections interconnect abutting ends of frame arms to resist twisting of said frame arms.

7. The stretcher of claim 6 wherein each of said frame arms includes an interior cavity running the length of said frame arm, and at least one rib member molded into said frame arm protruding from an interior surface of said frame arm into said interior cavity and generally running the length of said interior cavity to restrict bending and twisting of said frame arm.

8. The stretcher of claim 7 including at least one cross member molded into said frame arm extending through said interior cavity from said interior surface of said frame arm and generally running the length of said interior cavity to restrict bending and twisting of said frame arm.

9. A lightweight decontaminable stretcher for transporting injured persons and persons exposed to hazardous materials, comprising:

a foldable molded frame assembly for carrying a bed member adapted to receive and support a person;

a first frame pole and a second frame pole included in said frame assembly constructed from a plurality of frame arms;

a hinge pivotally connecting abutting ends of said frame arms for moving between a folded configuration and an unfolded configuration;

a hinge support carried opposite said hinge for interconnecting abutting ends of said frame arms when in said unfolded configuration, and said hinge support disengaging abutting ends of said frame arms to allow said frame arms to move to said folded configuration; and, a spreader bar included in said frame assembly interconnecting said first and second frame poles.

10. The stretcher of claim 9 wherein said molded frame assembly is constructed of a composite of 50% to 85% by weight of a polyamide resin containing 15% to 50% fiberglass by weight to resist hazardous materials and allow for decontamination of said frame assembly.

11. The stretcher of claim 9 wherein said hinge includes a first hinge portion molded into a distal end of a first frame arm, and a second hinge portion molded into an abutting distal end of a second frame arm; said first and second hinge portions have a plurality of spaced hinge projections forming a series of hinge slots; said hinge projections engaging said hinge slots of the abutting frame arm so that said hinge projections of said first and second frame arms overlap; and a pivot pin pivotally connecting overlapping hinge projections from said first and second hinge portion.

12. The stretcher of claim 11 wherein said hinge support includes a first support portion molded into said distal end of said first frame arm opposite said first hinge portion, and a second support portion molded into said abutting distal end of said second frame arm opposite said second hinge portion; said first and second support portions have a plurality of spaced support projections forming a series of support slots; said support projections engaging said support slots of the abutting frame arm when in said unfolded configuration so that said support projections interconnect abutting ends of frame arms to resist twisting of said frame arms.

13. The stretcher of claim 9 wherein each of said frame arms includes an interior cavity running the length of said frame arm, and at least one rib member molded into said frame arm protruding from an interior surface of said frame arm into said interior cavity and generally running the length of said interior cavity to restrict bending and twisting of said frame arm.

14. The stretcher of claim 9 wherein each of said frame arms includes an interior cavity running the length of said frame arm, and at least one cross member molded into said frame arm extending through said interior cavity from an interior surface of said frame arm and generally running the length of said interior cavity to restrict bending and twisting of said frame arm.

15. A lightweight decontaminable stretcher for transporting injured persons and persons exposed to hazardous materials, comprising:

a frame assembly having a first frame pole and a second frame pole interconnected by a spreader bar for maintaining said first and second frame poles in a laterally spaced arrangement;

a bed member carried by said first and second frame poles adapted for receiving and supporting a person between said frame poles;

said first and second frame poles having a hollow interior cavity to reduce weight; and, at least one reinforcing member formed on an interior surface of said frame poles within said hollow interior cavity and generally running the length of said hollow interior cavity to strengthen the rigidity of said frame poles to resist bending and twisting.

16. The stretcher of claim 15 wherein said reinforcing member includes a rib member molded into said frame pole protruding from an interior surface of said frame pole into said interior cavity and generally running the length of said interior cavity to restrict bending and twisting of said frame pole.

17. The stretcher of claim 15 wherein said at least one reinforcing member includes a cross member molded into said frame pole extending through said interior cavity from said interior surface of said frame pole and generally running the length of said interior cavity to restrict bending and twisting of said frame pole.

18. The stretcher of claim 15 including a plurality of reinforcing members comprising at least one rib member molded into said frame pole protruding from an interior surface of said frame pole into said interior cavity and generally running the length of said interior cavity to restrict bending and twisting of said frame pole, and at least one cross member molded into said frame pole extending through said interior cavity from said interior surface of said frame pole and generally running the length of said interior cavity to restrict bending and twisting of said frame pole.

19. The stretcher of claim 15 wherein said molded frame assembly is constructed of a composite of 50% to 85% by weight of a polyamide resin containing 15% to 50% fiberglass by weight to resist hazardous materials and allow for decontamination of said frame assembly.

* * * * *